(12) United States Patent
Sakurada

(10) Patent No.: US 11,422,557 B2
(45) Date of Patent: Aug. 23, 2022

(54) INFORMATION PROCESSING DEVICE AND AUTONOMOUS TRAVELING CONTROL SYSTEM INCLUDING INFORMATION PROCESSING DEVICE

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 16/800,441

(22) Filed: Feb. 25, 2020

(65) Prior Publication Data
US 2020/0293042 A1 Sep. 17, 2020

(30) Foreign Application Priority Data
Mar. 13, 2019 (JP) .............................. JP2019-045959

(51) Int. Cl.
*G05D 1/00* (2006.01)
*H04L 67/12* (2022.01)
(Continued)

(52) U.S. Cl.
CPC ............ *G05D 1/0088* (2013.01); *B60R 11/04* (2013.01); *G05D 1/0055* (2013.01); *G06V 20/58* (2022.01);
(Continued)

(58) Field of Classification Search
CPC .. G05D 1/0293; G05D 1/0295; G05D 1/0088; G05D 1/00; G01C 21/3415; B60W 30/12; B60W 40/09; B60W 50/04; B60W 30/165; G08G 1/0116; G08G 1/22; G06V 10/98; B60R 21/00
See application file for complete search history.

(56) References Cited

U.S. PATENT DOCUMENTS 6,128,559 A * 10/2000 Saitou ................. G05D 1/0295
701/1
6,313,758 B1 * 11/2001 Kobayashi ........... G05D 1/0295
701/29.2
(Continued)

FOREIGN PATENT DOCUMENTS

JP        2004299587 A  * 10/2004  ............ B60R 21/00
JP        2016-192028 A    11/2016
(Continued)

*Primary Examiner* — Yuri Kan
(74) *Attorney, Agent, or Firm* — Oliff PLC

(57) ABSTRACT

An information processing device includes a receiving unit configured to receive a signal sent from a wireless communication unit included in an autonomous vehicle, a failure determination unit configured to determine a failed vehicle in which an external monitoring camera has failed based on the signal from the wireless communication unit, a detection unit configured to detect a specific vehicle that is planned to travel on a route at least a section of which overlaps with a travel planned route of the failed vehicle beginning at a failure point of the failed vehicle that includes the exterior monitoring camera determined to be failed, and a sending unit configured to send travel control information to the failed vehicle to instruct the failed vehicle to travel in front of or behind the specific vehicle.

10 Claims, 5 Drawing Sheets

(51) Int. Cl.
  *B60R 11/04*   (2006.01)
  *G06V 20/58*   (2022.01)
  *H04N 5/225*   (2006.01)

(52) U.S. Cl.
  CPC ..... *H04L 67/12* (2013.01); *G05D 2201/0213* (2013.01); *G06V 2201/08* (2022.01); *H04N 5/2253* (2013.01)

(56) References Cited

U.S. PATENT DOCUMENTS

| | | | | |
|---|---|---|---|---|
| 7,062,381 | B1* | 6/2006 | Rekow | G05D 1/0295 342/126 |
| 2017/0259820 | A1 | 9/2017 | Takahashi | |
| 2017/0270798 | A1 | 9/2017 | Ushiba et al. | |
| 2018/0237012 | A1* | 8/2018 | Jammoussi | G01C 21/3415 |
| 2019/0025819 | A1* | 1/2019 | Ferguson | B60W 30/12 |
| 2019/0027045 | A1* | 1/2019 | Laur | B60W 30/165 |
| 2019/0197497 | A1* | 6/2019 | Abari | G05D 1/0088 |
| 2019/0241194 | A1* | 8/2019 | Fukasawa | G06V 10/98 |
| 2019/0241195 | A1* | 8/2019 | Sakamoto | B60W 50/04 |
| 2019/0302784 | A1* | 10/2019 | Benosman | G08G 1/22 |
| 2020/0133288 | A1* | 4/2020 | Abari | G05D 1/0088 |
| 2020/0189585 | A1* | 6/2020 | Sin | B60W 40/09 |
| 2020/0219387 | A1* | 7/2020 | Lin | G08G 1/0116 |

FOREIGN PATENT DOCUMENTS

| | | | | |
|---|---|---|---|---|
| JP | 2016192028 A | * | 11/2016 | ............ B60W 30/14 |
| JP | 2017-165296 A | | 9/2017 | |
| JP | 2018-037039 A | | 3/2018 | |
| JP | 2018-124932 A | | 8/2018 | |
| JP | 2019-036862 A | | 3/2019 | |
| WO | 2016/038931 A1 | | 3/2016 | |
| WO | 2019/035391 A1 | | 2/2019 | |

* cited by examiner

INFORMATION PROCESSING DEVICE AND AUTONOMOUS TRAVELING CONTROL SYSTEM INCLUDING INFORMATION PROCESSING DEVICE

INCORPORATION BY REFERENCE

The disclosure of Japanese Patent Application No. 2019-045959 filed on Mar. 13, 2019 including the specification, drawings and abstract is incorporated herein by reference in its entirety.

BACKGROUND

1. Technical Field

The present disclosure relates to an information processing device and an autonomous traveling control system including the information processing device.

2. Description of Related Art

Recently, there is an autonomous vehicle that travels autonomously with no need for the driver to perform some of the driving operations. An autonomous vehicle is equipped with exterior monitoring cameras (hereinafter also simply referred to as a camera) for capturing the surroundings of the vehicle. This autonomous vehicle requires a technique for ensuring safe driving even if a communication failure occurs due to a failure in some apparatuses.

Japanese Patent Application Publication No. 2016-192028 (JP 2016-192028 A) discloses an autonomous driving control system that, when a part of the position estimation information cannot be acquired, determines whether the vehicle can be driven autonomously based on the remaining position estimation information that has been acquired.

SUMMARY

Japanese Patent Application Publication No. 2016-192028 (JP 2016-192028 A) does not disclose a technique for continuing autonomous driving when a camera mounted on an autonomous vehicle fails during autonomous driving. This means that, when an exterior monitoring camera on an autonomous vehicle fails during autonomous driving, there is a possibility that the vehicle's safe driving control and autonomous driving control will be affected.

The present disclosure provides a technique that can reduce an impact on safe driving control and autonomous driving control of a vehicle when an exterior monitoring camera mounted on an autonomous vehicle fails.

An information processing device according to one aspect of the present disclosure is an information processing device that sends control information necessary for autonomous driving to an autonomous vehicle on which exterior monitoring cameras are mounted. The information processing device includes a receiving unit configured to receive a signal sent from a wireless communication unit included in the autonomous vehicle, a failure determination unit configured to determine a failed vehicle based on the signal from the wireless communication unit wherein the failed vehicle includes at least one of the external monitoring cameras that has failed, a detection unit configured to detect a specific vehicle wherein the specific vehicle is a vehicle that is planned to travel on a route at least a section of which overlaps with a planned route of the failed vehicle beginning at a failure point of the failed vehicle that includes the at least one of the exterior monitoring cameras determined to be failed, and a sending unit configured to send travel control information to the failed vehicle wherein the travel control information instructs the failed vehicle to travel in front of or behind the specific vehicle.

According to this aspect, when an exterior monitoring camera mounted on an autonomous vehicle fails, the traveling of the vehicle including this failed exterior monitoring camera can be controlled in such a way that the failed vehicle travels in front of or behind a specific vehicle that is planned to travel on a route at least a section of which overlaps with the travel planned route of the failed vehicle beginning at the failure point. As a result, even when an exterior monitoring camera fails, the failed vehicle can continue autonomous driving, thus reducing the possibility that the failure will have a significant effect on vehicle's safe driving control and autonomous driving control.

According to the present disclosure, a technique is provided that can reduce an impact on safe driving control and autonomous driving control of a vehicle when an exterior monitoring camera mounted on an autonomous vehicle fails.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
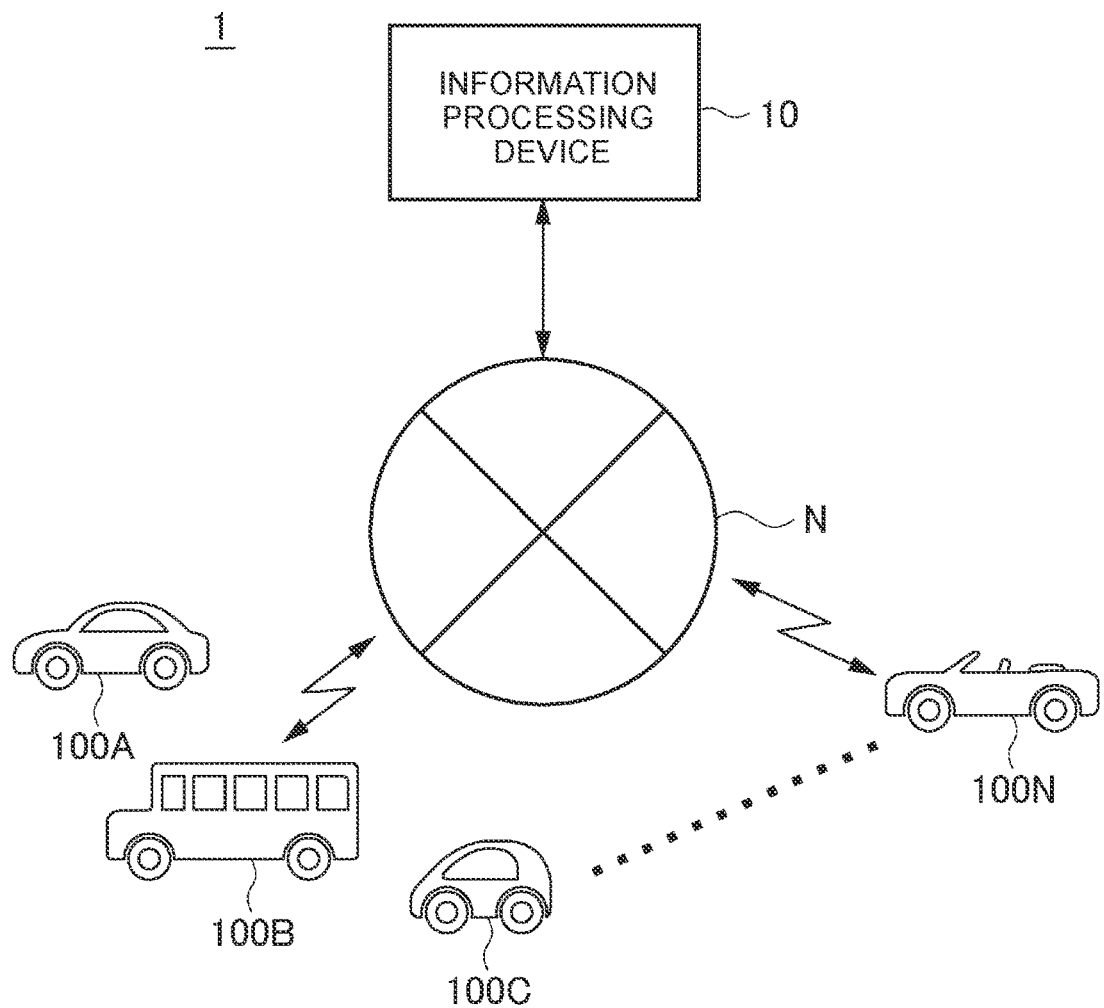
FIG. 1 is a schematic diagram of an information processing device and a plurality of vehicles capable of communicating with the information processing device.

A preferred embodiment of the present disclosure will be described in detail below with reference to the drawings. In the figures, components with the same reference numeral has the same or equivalent configuration.

FIG. 1 shows an autonomous travelling control system 1 that includes an information processing device 10 connected to a plurality of vehicles 100 via a network N. In the description below, a vehicle 100A, a vehicle 100B, and so on are used to refer to a specific vehicle 100, and a vehicle 100 is used to generically refer to a vehicle.

The communication network N shown in FIG. 1 may be any one of the Internet, a LAN, a mobile communication network, a Bluetooth (registered trademark) network, a WiFi (Wireless Fidelity) network, or other communication lines or may be a combination those networks and communication lines. Note that at least a part of the information processing device 10 may be implemented by cloud computing including one or more computers. In addition, at least a part of the processing in a control device 110 (described later) of the vehicle 100 may be performed by the information processing device 10.

Figure 2:
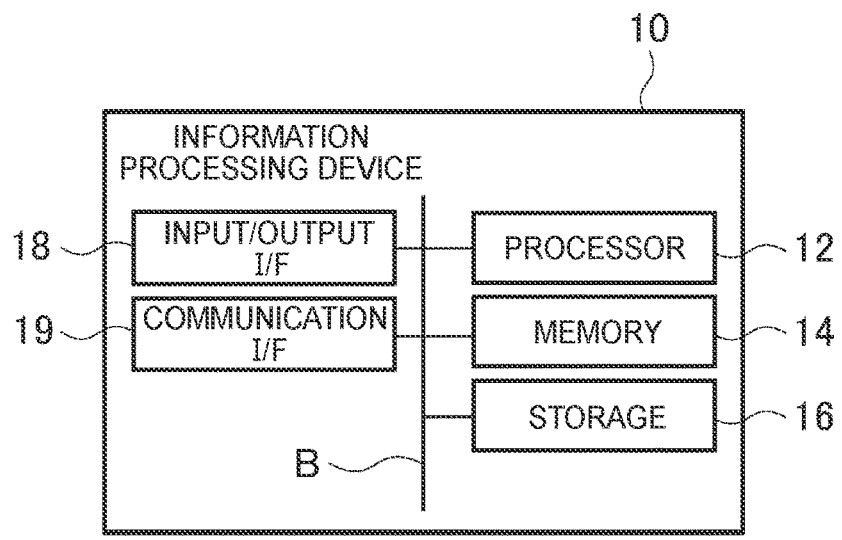
FIG. 2 is a block diagram showing a schematic hardware configuration of the information processing device.

FIG. 2 is a diagram showing an example of a hardware configuration of the information processing device 10 shown in FIG. 1. The information processing device 10 includes a processor 12, a memory 14, a storage 16, an input/output interface (input/output I/F) 18, and a communication interface (communication I/F) 19. The components of the hardware (HW) of the information processing device 10 are connected to each other via a bus B.

In the information processing device 10, the processor 12, memory 14, storage 16, input/output I/F 18, and communication I/F 19 work together to implement the functions and/or methods described in this embodiment.

The processor 12 performs functions and/or methods implemented by the code or instructions included in a program stored in the storage 16. The processor 12 includes, for example, a central processing unit (CPU), a micro processing unit (MPU), a graphics processing unit (GPU), a microprocessor, a processor core, a multiprocessor, an application-specific integrated circuit (ASIC), and a field programmable gate array (FPGA).

The memory 14 temporarily stores a program loaded from the storage 16 and provides a work area for the processor 12. The memory 14 also temporarily stores various data generated while the processor 12 is executing a program. The memory 14 includes, for example, a random access memory (RAM) and a read only memory (ROM).

The storage 16 stores programs to be executed by the processor 12. The storage 16 includes, for example, a hard disk drive (HDD), a solid state drive (SSD), and a flash memory.

The input/output I/F 18 includes an input device through which various operations for the information processing device 10 are entered and an output device through which processing results processed by the information processing device 10 are output.

The communication I/F 19 sends and receives various data via the network. The communication may be carried out by either wired or wireless connections, and any communication protocol may be used as long as mutual communication can be carried out. The communication I/F 19 has the function to communicate with the vehicle 100 via the network. The communication I/F 19 sends various types of data to another information processing device or the vehicle 100 according to an instruction from the processor 12.

Programs for implementing this embodiment may be stored on a computer-readable storage medium for distribution. This storage medium is a "non-transitory tangible medium" on which programs can be stored. The programs stored in the storage medium include application programs and system programs.

At least a part of processing by the information processing device 10 may be implemented by cloud computing configured by one or more computers. A configuration is also possible in which at least a part of processing by the information processing device 10 is performed by another information processing device. In this case, a configuration is also possible in which at least a part of processing of the functional units implemented by the processor 12 is performed by another information processing device.

Figure 3:
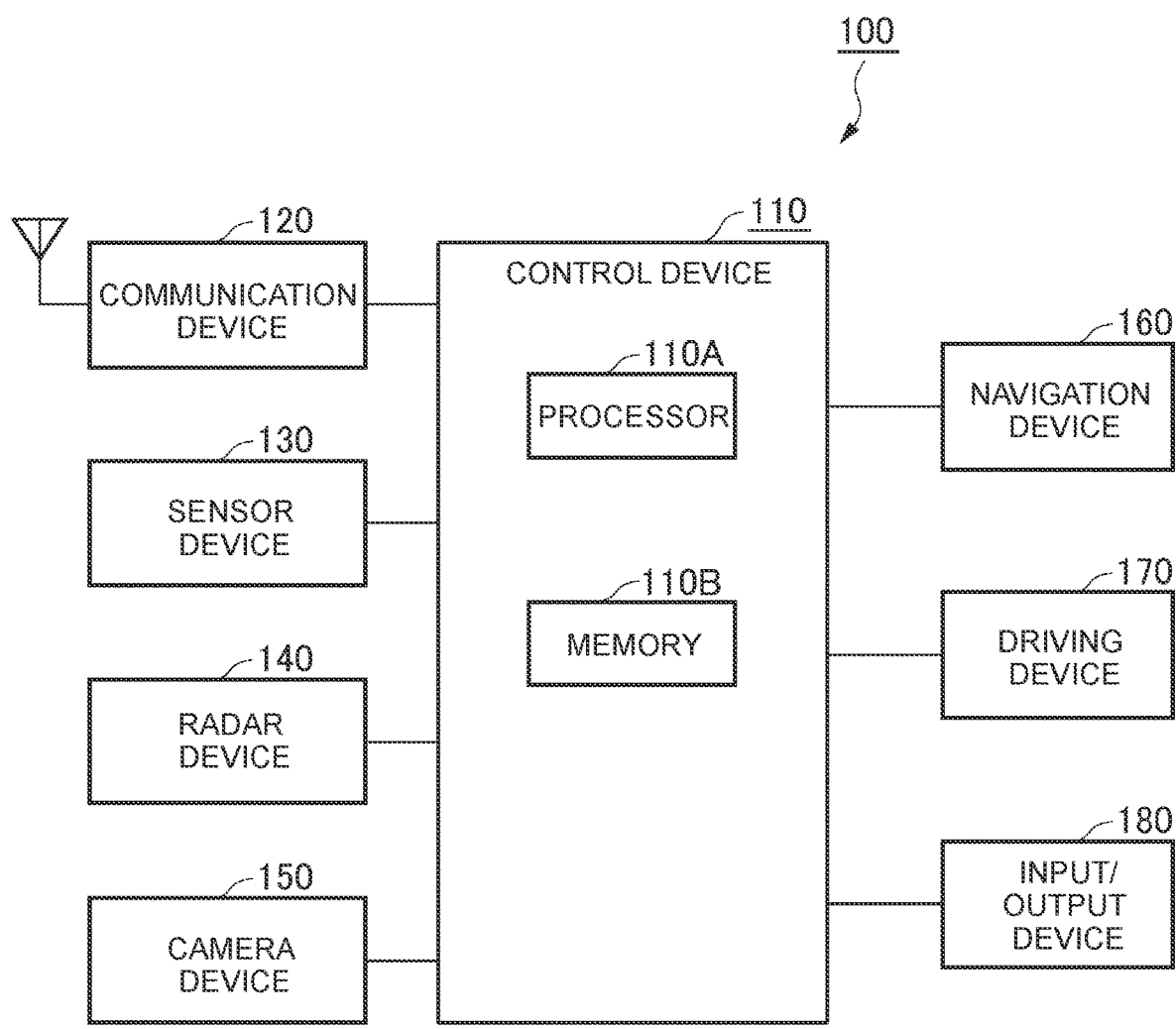
FIG. 3 is a block diagram showing a schematic hardware configuration of a vehicle.

FIG. 3 is a block diagram showing a schematic hardware configuration of the vehicle 100.

As shown in FIG. 3, the vehicle 100 includes the control device 110 and the devices connected to the control device 110 via the bus. The devices connected to the control device 110 are a communication device 120, a sensor device 130, a radar device 140, a camera device 150, a navigation device 160, a driving device 170, and an input/output device 180.

The control device 110 receives predetermined signals from the devices connected to it, performs processing such as the arithmetic processing, and outputs the control signal for driving the devices. The control device 110 includes a processor 110A and a memory 110B. The control device 110 causes the processor 110A to execute a computer program, recorded in the memory 110B, to function as a driving assistance system according to this embodiment.

The processor 110A performs predetermined arithmetic processing according to a computer program such as firmware stored in the memory 110B. The processor 110A is implemented by one or more central processing units (CPUs), micro processing unit (MPU), graphics processing units (GPUs), microprocessors, processor cores, multiprocessors, application-specific integrated circuits (ASICs), or field programmable gate arrays (FPGAs).

The memory 110B includes a non-volatile memory, such as MRAM, NAND flash memory, NOR flash memory or SSD, and hard disk drive, and a volatile memory such as SRAM or DRAM. The nonvolatile memory stores computer programs for executing various arithmetic processing shown in the flowcharts and other parts of this disclosure, the map data, and other various data necessary for this disclosure. The non-volatile memory corresponds to a non-transitory, tangible medium. The volatile memory provides a work area in which a computer program, loaded from the non-volatile memory, and various data, generated while the processor 110A is executing a computer program, are temporarily stored. A computer program or data acquired from the communication device 120 may also be stored in the non-volatile memory.

The communication device 120 includes a unit for sending or receiving information to or from an external device such as the information processing device 10. For example, the communication device 120 includes one or more units for communication via WiFi (wireless communication system based on the 802.11 standard developed by IEEE). The external device described above may be another vehicle 100 or an infrastructure facility installed under the road surface, on a utility pole, or on a building. In addition, the communication device 120 receives the GPS signal and outputs the position information on the vehicle 100 to the control device 110.

The sensor device 130, which is a sensor for detecting the behavior of the vehicle 100, includes a rotary encoder for detecting the speed of the vehicle and a gyro sensor for detecting the inclination of the vehicle. In addition, the sensor device 130 may include a magnetic sensor for detecting a marker and the like embedded in a road. The radar device 140 has a LiDAR ranging system that includes a millimeter wave radar for avoiding a collision with an object such as a pedestrian. The camera device 150 includes a plurality of cameras, each including an image sensor such as a CCD or a CMOS image sensor, for capturing the image in front of, to the left and right of, and behind the vehicle 100 (images including the surroundings of the vehicle 100). The control device 110 can receive signals, acquired by the sensor device 130, radar device 140, and camera device 150 and, based on the received signals, output the control signal to the devices. For example, the control device 110 acquires the signal, captured by the camera device 150, for recognizing the image and recognizes an obstacle included in the captured image. Then, based the recognized obstacle, the control device 110 outputs the control signal to the driving device 170 for stopping the vehicle 100. Another configuration is also possible in which an image processing semiconductor IC (such as a GPU) that enables image recognition is mounted in the camera device 150. In this configuration, a lane in which the vehicle 100 is to travel or an obstacle such as a pedestrian is recognized based on the images captured by the cameras of the camera device 150 and the recognition results are output to the control device 110.

The navigation device 160 calculates a route to the predetermined destination based on an input from the driver and guides the driver to the destination. The navigation device 160, with a non-volatile memory not shown, may store the map data in this non-volatile memory. Instead, the navigation device 160 may acquire the map data from the memory 110B or may acquire the map data from the communication device 120. The map data includes the information on road types, road signs, traffic lights, and so on. The map data also includes the position information on specific points (called nodes) such as facilities, addresses, and intersections on roads, and the information on roads (called links) each of which connects nodes. The position information is indicated, for example, by latitude, longitude, and altitude.

The navigation device 160 may include a processor to calculate a route or may cause the processor 110A to calculate a route. To acquire the current position information on the vehicle 100, the navigation device 160 may acquire the position information, which is obtained based on the GPS signal received from the communication device 120, from the control device 110 or the navigation device 160 itself may receive the GPS signal to acquire the current position. In addition, the navigation device 160 may be configured by the information processing terminal of the driver. In this case, the information processing terminal may be connected to the apparatus of the communication device 120 of the vehicle 100 to receive the GPS signal, and the route guidance information for guiding the vehicle along the route may be output from the input/output device 180 of the vehicle 100.

The driving device 170, which includes the motor and other actuators for the engine, brake, and steering wheel operation of the vehicle 100, operates based on the control signal received from the control device 110. The vehicle 100 may be configured in such a way that the control device outputs the control signal to the driving device 170 when the driver steps on the accelerator pedal or the brake pedal or turns the steering wheel. Instead, the vehicle 100 may have the autonomous driving function that causes the control device 110 to output the autonomous-driving control signal to the driving device 170 based on the signal acquired from the radar device 140 or the camera device 150. The vehicle 100 may be an electric vehicle that includes a battery and an electric motor.

The input/output device 180 includes an input device, such as a touch panel and a microphone for the driver to enter information into the vehicle 100, and voice recognition processing software. The input/output device 180 is configured to allow the driver to enter the information, necessary for controlling the vehicle 100, when the driver touches the screen of the touch panel or speaks to the microphone. The input/output device 180 also includes an output device such as a liquid crystal display, a head-up display (HUD), and other displays for outputting image information and one or more speakers for outputting voice information.

Figure 4:
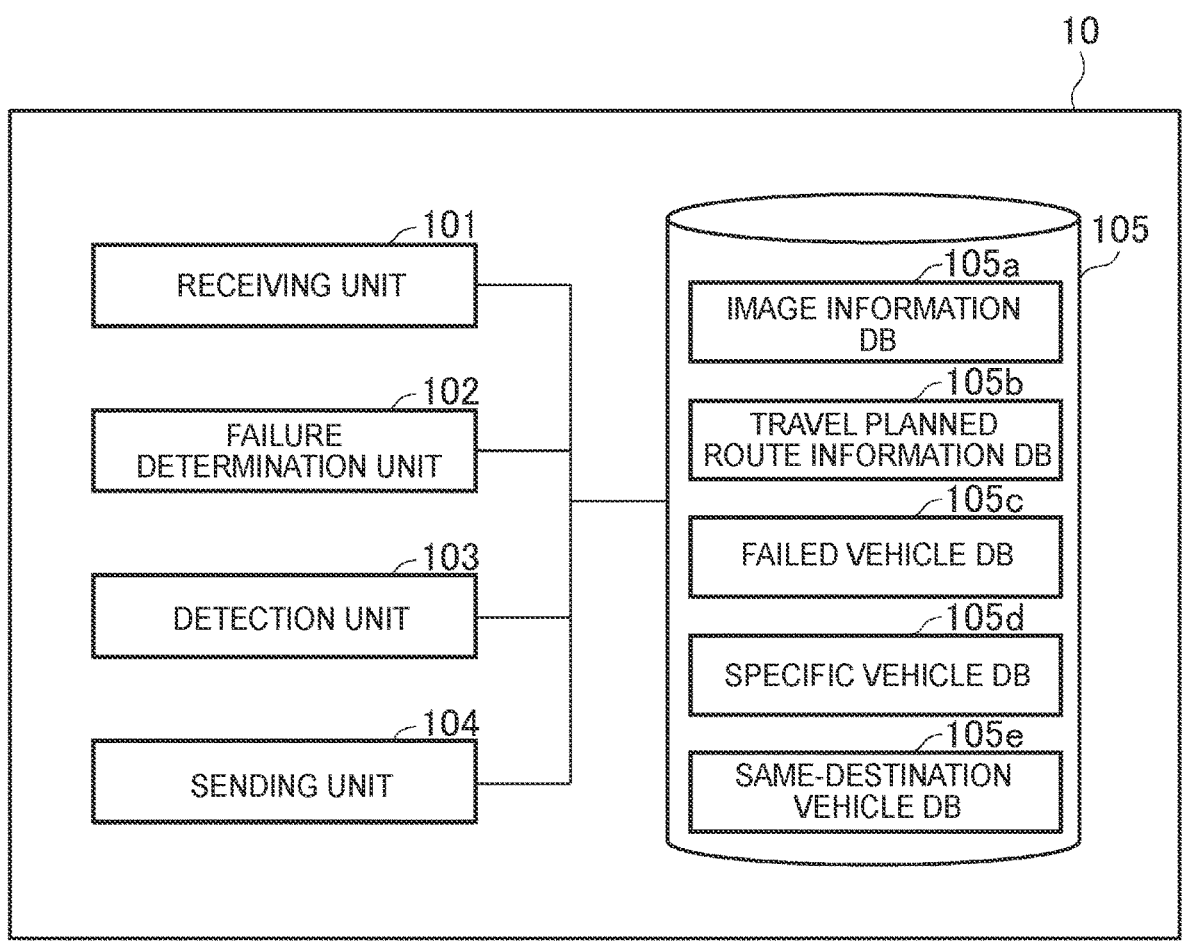
FIG. 4 is a diagram showing an example of a functional block configuration of the information processing device.

FIG. 4 is a diagram showing an example of a functional block configuration of the information processing device 10.

The information processing device 10 includes a receiving unit 101, a failure determination unit 102, a detection unit 103, a sending unit 104, and a storage unit 105.

The receiving unit 101 receives signals sent from the wireless communication unit included in an autonomous vehicle. For example, the receiving unit 101 receives the image information captured by the camera device 150. This image information is the information on the images in front of and behind the vehicle 100 including the image of the surroundings of the vehicle 100. The receiving unit 101 also receives the information that is sent via the communication device 120, such as the information on the position, vehicle speed, and the traveling direction (azimuth) of the vehicle 100 as well as the travel planned route information on the vehicle 100. The information received by the receiving unit 101 is stored in an image information DB 105a or in a travel planned route information DB 105b of the storage unit 105.

The failure determination unit 102 determines, based on the signal from the wireless communication unit of the vehicle 100, whether the vehicle is a failed vehicle in which the camera device 150 (at least one of the exterior monitoring cameras) has failed. The information on a failed vehicle determined by the failure determination unit 102 is stored in a failed vehicle DB 105c of the storage unit 105. The failure determination unit 102 determines that the camera device 150 has failed when the receiving unit 101 has not received at least one of a plurality of pieces of the image information (information on images in front of, to the left and right of, and behind the vehicle 100) captured by the camera device 150. In other words, when there is an abnormality in the image information captured by the camera device 150 and received by the information processing device 10, the failure determination unit 102 determines that the camera device 150 has failed. In this way, when the failure determination unit 102 determines that at least one of the cameras of the camera devices 150 has failed, the vehicle 100 is referred to as a failed vehicle in this specification.

The detection unit 103 detects the vehicle 100 that is planned to travel on a route at least a section of which overlaps with the travel planned route of a failed vehicle beginning at the failure point of the failed vehicle that includes the camera device 150 determined to be failed (in the description below, such vehicle 100 is referred to as a specific vehicle). The information on a specific vehicle detected by the detection unit 103 is stored in a specific vehicle DB 105d of the storage unit 105.

The sending unit 104 sends the travel control information to a failed vehicle so that the failed vehicle will travel in front of or behind a specific vehicle. Details of the traveling control of a failed vehicle will be described later.

The storage unit 105 includes the image information DB 105a, travel planned route information DB 105b, failed vehicle DB 105c, and specific vehicle DB 105d described above as well as a same-destination vehicle DB 105e. In the same-destination vehicle DB 105e, the information on the vehicles traveling to the same destination as the final destination of the failed vehicle is stored.

Figure 5:
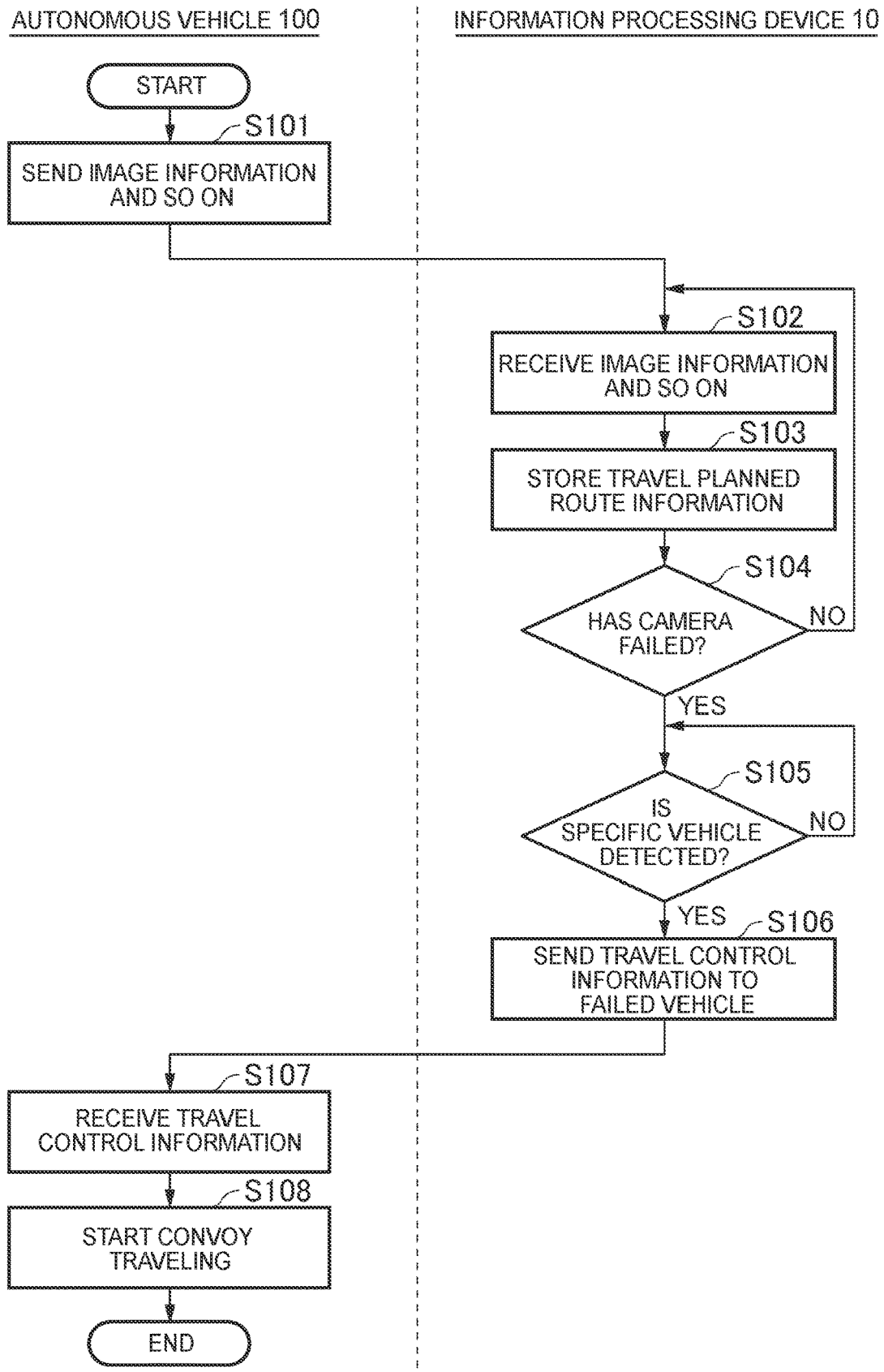
FIG. 5 is a flowchart showing an example of the processing procedure performed by the information processing device.

<Processing procedure> Next, the processing procedure performed by the information processing device 10 will be described. FIG. 5 is a flowchart showing an example of the processing procedure performed by the information processing device.

In step S101, the vehicle 100 sends the image information and so on about the vehicle 100 to the information processing device 10. The image information and so on include the image information on the surroundings of the vehicle 100 (images in front of, behind, and to the left and right of the vehicle 100) captured by the camera device 150 as well as the position information, time information, vehicle speed and traveling direction (direction) information on the vehicle 100 sent via the communication device 120. The "image information and so on" in this specification is not limited to the information described above, but includes the information necessary for the travel control information that will be described later. As described above, the signal received from the wireless communication unit (the communication device 120) of the vehicle 100 includes the image information captured by the exterior monitoring cameras (camera device 150) that capture the surroundings of the vehicle 100 that is traveling.

In step S102, the information processing device 10 (center) receives the image information and so on sent from the vehicle 100 that is traveling.

In step S103, based on the received image information and so on, the information processing device 10 stores the information, including the travel planned route information for each of the vehicles 100, in the storage unit 105.

In step S104, based on the signal received from the communication device 120 of the vehicle 100, the failure determination unit 102 determines whether the camera device 150 mounted on the vehicle 100 has failed. The failure determination unit 102 determines that the camera device 150 has failed when the receiving unit 101 does not receive at least one of the four pieces of the image information on the vehicle 100 (that is, the information on the image in front of, to the left of, to right of, and behind the vehicle 100) captured by the camera device 150. When it is determined by the failure determination unit 102 that the camera device 150 has not failed (step S104 (NO)), the processing returns to step S102 for repeating the above steps. On the other hand, when it is determined that the camera device 150 has failed (step S104 (YES)), the processing proceeds to step S105.

In step S105, the detection unit 103 detects a specific vehicle that is planned to travel on a route at least a section of which overlaps with the travel planned route of the failed vehicle beginning at the failure point of the failed vehicle that includes at least one camera of the camera device 150 determined to be failed. For example, the detection unit 103 checks the vehicles 100 located around the failed vehicle when the failure occurred (hereinafter these vehicles are also referred to as surrounding vehicles). From those vehicles 100, the detection unit 103 may detect, as a specific vehicle, the vehicle 100 that has the greatest number of sections that overlap with the travel planned route of the failed vehicle. In step S105, the processing in step S105 is repeated until a specific vehicle is detected by the detection unit 103. When a specific vehicle is detected, the processing proceeds to step S106. When a specific vehicle is not detected in step S105, the sending unit 104 may stop the failed vehicle at a safe place around the point where the failure occurred and then send the travel control information to the failed vehicle to instruct it to wait until a specific vehicle arrives.

In step S106, the sending unit 104 of the information processing device 10 sends the travel control information, which will be described below, to the failed vehicle determined by the failure determination unit 102. As will be described later, the travel control information that the sending unit 104 sends to the failed vehicle includes the information generated based on the image information captured by the exterior monitoring cameras of the vehicle traveling in front of or behind the failed vehicle.

In step S107, the failed vehicle receives the travel control information sent from the sending unit 104. Based on this travel control information, the failed vehicle starts convoy traveling (step S108).

Figure 6A:
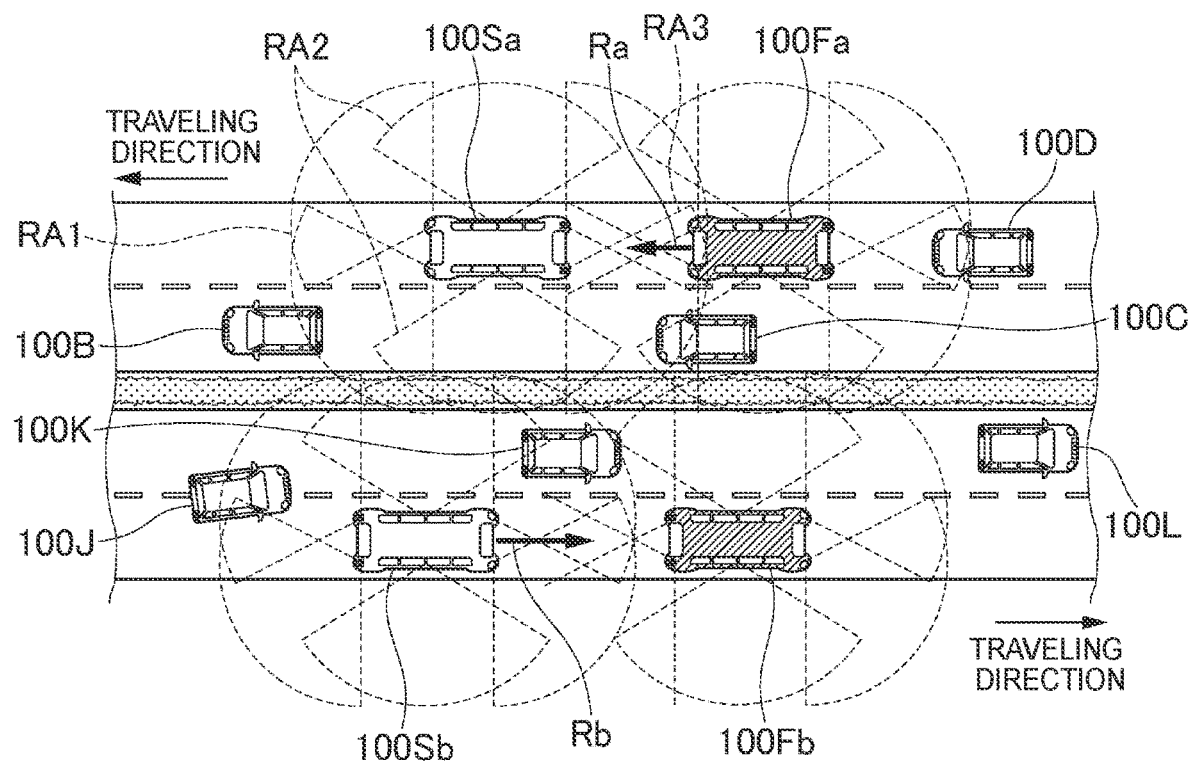
FIG. 6A is a diagram showing an example of an operation when a camera fails.
Figure 6B:
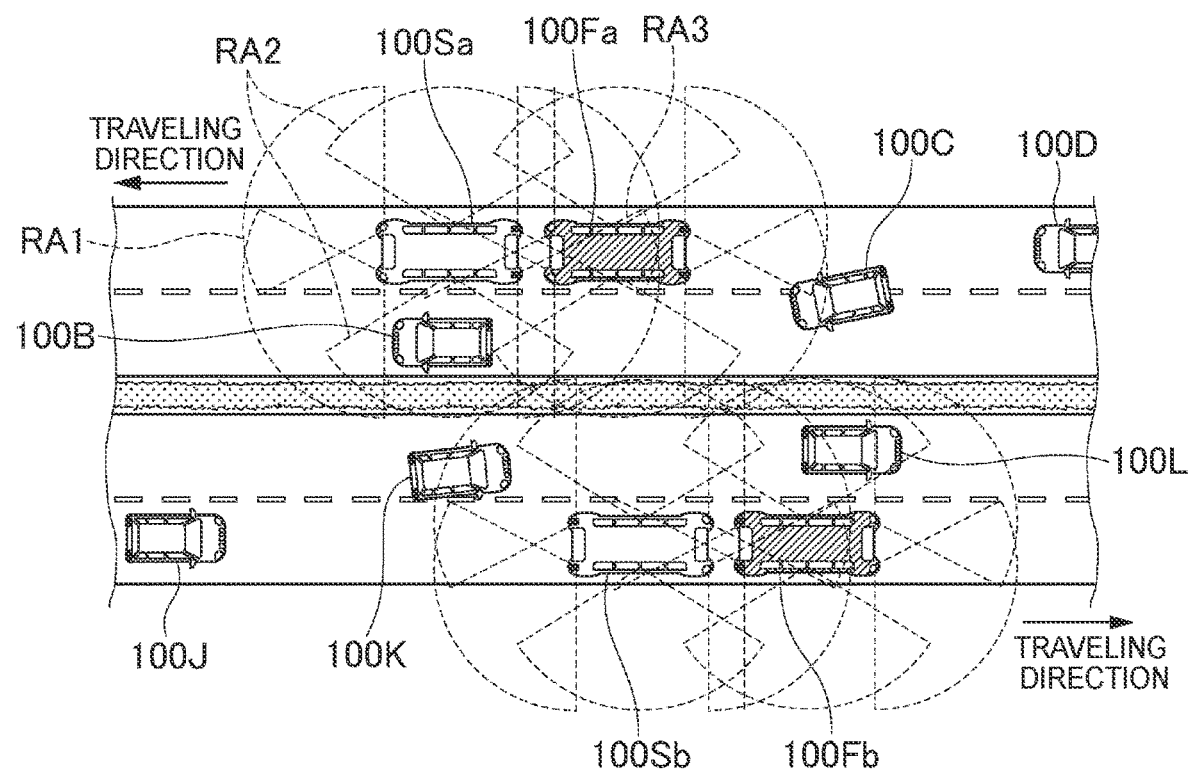
FIG. 6B is a diagram showing another example of an operation when a camera fails.

Convoy traveling shown in step S108 will be described with reference to the example shown in FIG. 6A and FIG. 6B. FIG. 6A shows the state before convoy traveling is started, and FIG. 6B shows the state after convoy traveling is started. In FIG. 6A and FIG. 6B, the capturing range of the camera device (exterior monitoring cameras) mounted on each vehicle is indicated by RA1 (capturing range in front of the vehicle), RA2 (capturing ranges on the left and right of the vehicle), and RA3 (capturing range behind the vehicle). In FIG. 6A and FIG. 6B, the failed vehicle is indicated by the reference numerals 100Fa and 100Fb, the specific vehicle is indicated by reference numerals 100Sa and 100Sb, and the vehicles traveling around the failed vehicle are indicated by the reference numerals 100B, 100C, 100D, 100J, 100K, and 100L.

In the top lane in FIG. 6A (in FIG. 6A and FIG. 6B, the top lane is the lane in which the traveling direction is the left direction), a vehicle in which the camera device that captures the area in front of the vehicle has failed is indicated as a failed vehicle 100Fa. When a specific vehicle 100Sa is detected that is planned to travel on a route at least a section of which overlaps with the travel planned route of the failed vehicle 100Fa beginning at the failure point of the failed vehicle, the travel control information, which instructs that the failed vehicle 100Fa should travel behind the specific vehicle 100S a, is sent to the failed vehicle 100Fa (in other words, the traveling is controlled in such a way that the failed vehicle 100Fa is moved in the direction indicated by the arrow Ra in FIG. 6A to reduce the inter-vehicle distance between the failed vehicle 100Fa and the specific vehicle 100Sa). The traveling of the failed vehicle 100Fa, when controlled in this way, allows the failed vehicle 100Fa to continue autonomous driving while traveling behind the specific vehicle 100Sa as shown in FIG. 6B. The image information, obtained by capturing the area in front of the specific vehicle 100Sa with the camera device of the specific vehicle 100Sa that is traveling in the convoy mode, may be sent to the failed vehicle 100Fa via vehicle-to-vehicle communication (communication between the specific vehicle 100Sa and the failed vehicle 100Fa) or via the information processing device 10, to complement the function of the failed camera device to allow the failed vehicle 100Fa to continue autonomous driving. As described above, when the failure determination unit 102 determines that an exterior monitoring camera that is one of the exterior monitoring cameras mounted on a failed vehicle and that captures the area in front of the failed vehicle has failed, the sending unit 104 sends the travel control information to the failed vehicle to instruct the failed vehicle to travel behind the specific vehicle.

In the bottom lane in FIG. 6A (in FIG. 6A and FIG. 6B, the bottom lane is the lane in which the traveling direction is the right direction), a vehicle in which the camera device that captures the area behind the vehicle has failed is indicated as a failed vehicle 100Fb. When a specific vehicle 100Sb is detected that is planned to travel on a route at least a section of which overlaps with the travel planned route of the failed vehicle 100Fb beginning at the failure point of the failed vehicle, the travel control information, which instructs that the failed vehicle 100Fb should travel in front of the specific vehicle 100Sb, is sent to the specific vehicle 100Sb or the failed vehicle 100Fb (for example, the traveling is controlled in such a way that the specific vehicle 100Sb is moved in the direction indicated by the arrow Rb in FIG. 6A to reduce the inter-vehicle distance between the failed vehicle 100Fb and the specific vehicle 100Sb. In this example, though the traveling of the specific vehicle 100Sb is controlled, the traveling of the failed vehicle 100Fb may be controlled to reduce the distance between the vehicles). The traveling of the specific vehicle 100Sb or the failed vehicle 100Fb, when controlled in this way, allows the failed vehicle 100Fb to continue autonomous driving while traveling in front of the specific vehicle 100Sb as shown in FIG. 6B. The image information, obtained by capturing the area behind the specific vehicle 100Sb with the camera device of the specific vehicle 100Sb that is traveling in the convoy mode, may be sent to the failed vehicle 100Fb via vehicle-to-vehicle communication (communication between the specific vehicle 100Sb and the failed vehicle 100Fb) or via the information processing device 10, to complement the function of the failed camera device to allow the failed vehicle 100Fb to continue autonomous driving. As described above, when the failure determination unit 102 determines that an exterior monitoring camera that is one of the exterior monitoring cameras mounted on a failed vehicle and that captures the area behind the failed vehicle has failed, the sending unit 104 sends the travel control information to the failed vehicle to instruct the failed vehicle to travel in front of the specific vehicle.

In step S108 described above, when the detection unit 103 detects that the travel planned route of the specific vehicle 100Sa or 100Sb deviates during traveling from the travel planned route of the failed vehicle 100Fa or 100Fb that travels in front of or behind the specific vehicle 100Sa or 100Sb, the detection unit 103 may detect the vehicle 100 that is planned to travel to the same destination as the final destination of the failed vehicle 100Fa or 100Fb (same-destination vehicle). When the detection unit 103 detects a same-destination vehicle, the sending unit 104 may send the travel control information to the failed vehicle 100Fa or 100Fb to instruct the failed vehicle to travel in front of or behind the same-destination vehicle.

In addition, in step S108 described above, when the detection unit 103 detects that the travel planned route of the specific vehicle 100Sa or 100Sb deviates during traveling from the travel planned route of the failed vehicle 100Fa or 100Fb that are traveling in front of or behind the specific vehicle 100Sa or 100Sb, the sending unit 104 may send the travel control information to the failed vehicle 100Fa or 100Fb to instruct the failed vehicle to temporarily stop in a specific area around the detected position and to wait for the vehicle 100 that will travel along the same route as the travel planned route of the vehicle 100Fa or 100Fb.

In the example used in the embodiment described above, a specific vehicle is an autonomous vehicle. However, a specific vehicle is not limited to an autonomous vehicle as in the example but may be a vehicle that is not autonomous.

The travel control information that the sending unit 104 sends to a failed vehicle may include not only the image information captured by the exterior monitoring cameras of the specific vehicle (guide vehicle) traveling in front of or behind the failed vehicle but also the image information captured by the exterior monitoring cameras of the vehicles traveling around the failed vehicle (surrounding vehicles). That is, the autonomous driving information to be provided to the failed vehicle may be generated based on the image information captured by those vehicles. In the embodiment described above, the sending unit 104 sends the travel control information to a failed vehicle. Instead of this, the sending unit 104 may send the information (for example, the position information, time information, and vehicle speed and traveling direction information on the failed vehicle and the other information including the image information, position information, time information, and vehicle speed and travel direction information on the surrounding vehicles) to a specific vehicle to control the traveling in such a way that the specific vehicle, which has received the information, moves in front of or behind the failed vehicle (in convoy travel mode).

The embodiment described above is intended to facilitate understanding of the present disclosure but is not construed as limiting the present disclosure. In the embodiment described above, an example of the autonomous travelling control system has been described that includes the information processing device and the autonomous vehicles each of which receives the travel control information from the information processing device and, based on this travel control information, changes the mode to the autonomous driving mode. Instead of the configuration in this example, one or more of the functions included in the information processing device may be mounted on an autonomous vehicle, or at least a part of the processing of the functional units of the information processing device described above may be mounted on an autonomous vehicle. The flowchart and the sequence described in the embodiment, the components provided in the embodiment, and the arrangement, material, condition, shape, size, and so on of the components are not limited to those shown in the embodiment, but may be changed as appropriate. In addition, it is possible to partially replace or combine components shown in different embodiments.

What is claimed is:

1. An information processing device that includes a processor that sends control information necessary for autonomous driving to an autonomous vehicle on which exterior monitoring cameras are mounted, the processor configured to execute steps comprising:
   receiving a signal sent from a wireless communication unit included in the autonomous vehicle;
   determining a failed vehicle based on the signal from the wireless communication unit, the failed vehicle including at least one of the external monitoring cameras that has failed;
   detecting a specific vehicle, the specific vehicle being a vehicle that is planned to travel on a route at least a section of which overlaps with a planned route of the failed vehicle beginning at a failure point of the failed vehicle that includes the at least one of the exterior monitoring cameras determined to be failed;
   sending travel control information to the failed vehicle, the travel control information instructing the failed vehicle to travel in front of or behind the specific vehicle; and
   stopping the failed vehicle at a safe place at the failure point and sending the travel control information to the failed vehicle to instruct it to wait until the specific vehicle arrives based on a situation when the specific vehicle is not detected.

2. The information processing device according to claim 1, wherein the signal from the wireless communication unit includes image information
   captured by the external monitoring cameras that capture surroundings of the autonomous driving vehicle that is traveling.

3. The information processing device according to claim 1, wherein the external monitoring cameras capture areas in front of, to left and right of, and behind the autonomous driving vehicle that is traveling.

4. The information processing device according to claim 1, wherein the travel control information sent to the failed vehicle is information generated based on image information captured by the external monitoring cameras of a vehicle traveling in front of or behind the failed vehicle.

5. The information processing device according to claim 1, wherein the processor is further configured to execute a step of determining that a failure has occurred in the exterior monitoring cameras when at least one piece of image information on the areas in front of, to the left and right of, and behind the autonomous vehicle captured by the external monitoring cameras is not received.

6. The information processing device according to claim 1, wherein when it is determined that the exterior monitoring camera that is one of the exterior monitoring cameras mounted on the failed vehicle for capturing the area in front of the failed vehicle has failed, the processor is further configured to execute a step of sending the travel control information to the failed vehicle to instruct the failed vehicle to travel behind the specific vehicle.

7. The information processing device according to claim 1, wherein when it is determined that the exterior monitoring camera that is one of the exterior monitoring cameras mounted on the failed vehicle for capturing the area behind the failed vehicle has failed, the processor is further configured to execute a step of sending the travel control information to the failed vehicle to instruct the failed vehicle to travel in front of the specific vehicle.

8. The information processing device according to claim 1, wherein the processor is further configured to, when a travel planned route of the specific vehicle that is traveling deviates from a travel planned route of the failed vehicle that is traveling in front of or behind the specific vehicle, execute steps of:
 detecting a same-destination vehicle that is planned to travel to the same destination as a destination of the failed vehicle, and
 sending the travel control information to the failed vehicle to instruct the failed vehicle to travel in front of or behind the same-destination vehicle.

9. The information processing device according to claim 1, wherein when it is detected that a travel planned route of the specific vehicle that is traveling deviates from a travel planned route of the failed vehicle that is traveling in front of or behind the specific vehicle, the processor is further configured to execute a step of sending the travel control information to cause the failed vehicle to temporarily stop in a specific area around a detected position and to wait for a vehicle that is traveling on the same route as the travel planned route of the failed vehicle.

10. An autonomous travelling control system comprising:
 the information processing device according to claim 1; and
 autonomous vehicles each of which receives the travel control information provided from the information processing device and drives autonomously based on the travel control information.

\* \* \* \* \*